United States Patent
Takahashi et al.

[11] Patent Number: 5,815,473
[45] Date of Patent: Sep. 29, 1998

[54] OPTICAL PICKUP DEVICE FOR DETECTING TRACKING ERROR OF OPTICAL DISKS WITH DIFFERENT TRACK PITCHES

[75] Inventors: Yoshitaka Takahashi; Masami Emoto, both of Yokohama, Japan

[73] Assignee: Ricoh Company, Ltd., Tokyo, Japan

[21] Appl. No.: 628,777

[22] Filed: Apr. 5, 1996

[30] Foreign Application Priority Data

Apr. 11, 1995 [JP] Japan ................................. 7-084398
Jul. 28, 1995 [JP] Japan ................................. 7-192919

[51] Int. Cl.⁶ ................................................. G11B 7/09
[52] U.S. Cl. ............................... 369/44.26; 369/44.41; 369/44.37; 369/44.29
[58] Field of Search ........................... 369/44.26, 44.41, 369/44.37, 44.29, 44.25, 54, 44.35, 44.42

[56] References Cited

U.S. PATENT DOCUMENTS

| | | | |
|---|---|---|---|
| 5,148,424 | 9/1992 | Wachi | 369/44.37 |
| 5,155,717 | 10/1992 | Bakx | 369/44.37 |
| 5,216,652 | 6/1993 | Yoshio et al. | 369/44.37 |
| 5,235,583 | 8/1993 | Jongenelis et al. | 369/44.37 |
| 5,619,482 | 4/1997 | Tezuka et al. | 369/44.41 |

FOREIGN PATENT DOCUMENTS 6-301980 of 1994 Japan.
6-318323 of 1994 Japan.
6-318335 of 1994 Japan.

OTHER PUBLICATIONS

"A New Tracking Servo Method: Differential Push–Pull Method" by K. Ohsato, Dec. 18, 1986.

*Primary Examiner*—Thang V. Tran
*Attorney, Agent, or Firm*—Dickstein Shapiro Morin &Oshinsky LLP

[57] ABSTRACT

An optical pickup device includes an optical system which forms a main spot and a set of sub-spots on an optical disk by a beam of light passing the optical system. A photodetector unit outputs first signals in response to a reflection beam from the main spot, and outputs second signals in response to reflection beams from the sub-spots. A tracking error detector includes a first detection circuit designed to output a first tracking error signal for a first track pitch, and a second detection circuit designed to output a second tracking error signal for a second track pitch different from the first track pitch. A switch selectively connects one of the first detection circuit and the second detection circuit to an output of the tracking error detector in response to a track pitch of the optical disk, so that one of the first and second tracking error signals appropriate for the track pitch of the optical disk is output.

9 Claims, 7 Drawing Sheets

OPTICAL PICKUP DEVICE FOR DETECTING TRACKING ERROR OF OPTICAL DISKS WITH DIFFERENT TRACK PITCHES

BACKGROUND OF THE INVENTION (1) Field of the Invention

The present invention relates to an optical pickup device which accesses an optical disk by detecting a tracking error from signals output by a photodetector unit in order to correct an error of a spot on a track of the optical disk to the exact position.

(2) Description of the Related Art

Generally, an optical pickup device for accessing an optical disk requires a tracking servo control which allows a beam of emission light to trail a track of the optical disk to the exact position when recording, playing or erasing information on the optical disk. By this tracking servo control, a tracking error is detected based on reflection beams from spots on the optical disk, so that the tracking error of the spot is corrected to direct the light beam to the exact position of the track of the optical disk.

To provide the tracking servo control capability for the optical pickup device, some tracking error detection methods have been proposed. One of the proposed methods is called a three-beam method of tracking error detection. This method is known in the prior art.

Figure 1:
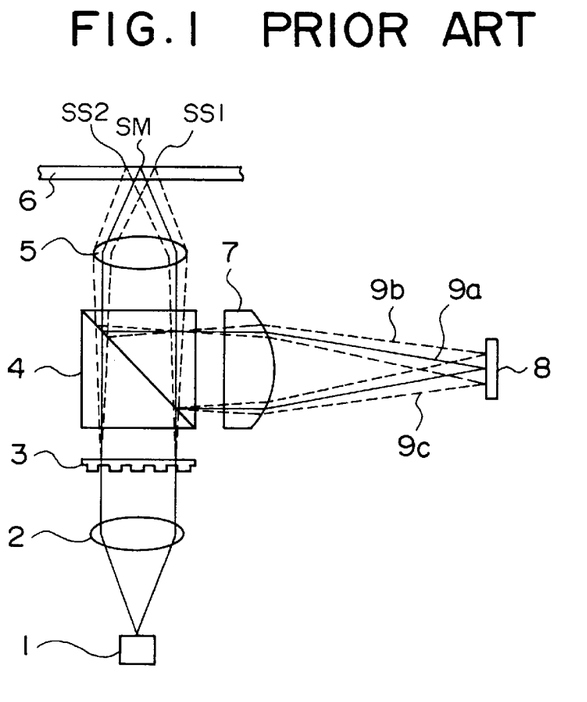
FIG. 1 is a side view of an optical system of a conventional optical pickup device.

FIG. 1 shows an optical system of a conventional optical pickup device in which a tracking error is detected by using the three-beam method.

As shown in FIG. 1, a beam of laser light emitted by a laser diode 1 enters a collimator lens 2, and a parallel beam leaves the collimator lens 2. The parallel beam from the collimator lens 2 enters a diffraction grating 3, and the parallel beam is divided into a number of diffracted light beams by the diffraction grating 3. The diffracted light beams leaving the grating 3 are passed through a beam splitter 4. The diffracted light beams enter an objective lens 5, and converging diffracted light beams leave the objective lens 5 so that very small spots SM, SS1 and SS2 of the diffracted light beams hit a surface of an optical disk 6.

Reflection beams from the spots SM, SS1 and SS2 on the optical disk 6 re-enter the objective lens 5, and parallel beams leave the objective lens 5. The parallel beams from the objective lens 5 enter the beam splitter 4 again, and reflection beams, split from the incident beams, are reflected off the beam splitter 4 in a direction perpendicular to the direction of the incident beams. The reflection beams from the beam splitter 4 enter a cylindrical-convex lens 7, and converging diffracted light beams 9a, 9b and 9c leave the cylindrical-convex lens 7. The diffracted light beams 9a, 9b and 9c from the cylindrical-convex lens 7 hit a surface of a photodetector unit 8, and the photodetector unit 8 outputs signals in accordance with the diffracted light beams on the surface of the photodetector unit 8.

The cylindrical-convex lens 7 is a composite lens having a surface on which a cylindrical lens is formed, and another surface on which a convex lens is formed.

Figure 2:
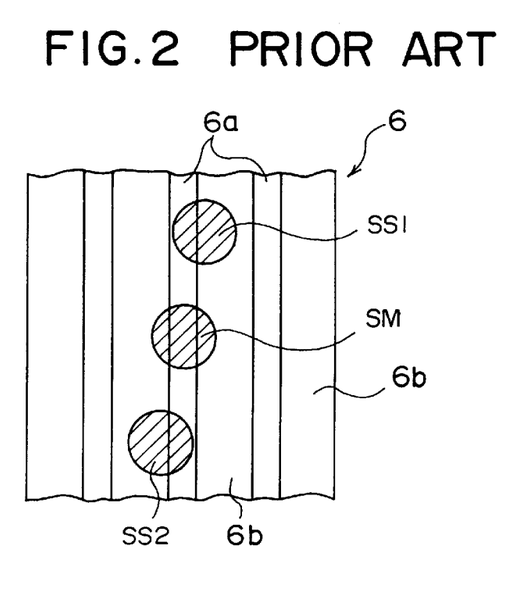
FIG. 2 is a diagram for explaining a relationship in position between spots from the conventional optical pickup device and a track of an optical disk.

FIG. 2 shows a relationship in position between spots from the optical disk 6 and a track of the optical disk 6.

As shown in FIG. 2, the optical disk 6 has a number of tracks which are formed on the surface of the optical disk 6 by grooves 6a and lands 6b between the grooves 6a. The optical disk 6 has a track pitch Tp which is a radial-direction distance between two adjacent tracks of the tracks on the surface of the optical disk 6.

The spots SM, SS1 and SS2 from the conventional optical pickup device are cast on the surface of the optical disk 6, as shown in FIG. 2.

The spot SM on the optical disk 6 is a main spot which is used when recording, playing or erasing information on the optical disk 6, and used for the focus error detection. The spot SM is formed by a 0-order diffracted light beam leaving the diffraction grating 3.

The spots SS1 and SS2 on the optical disk 6 are sub-spots which are used for the tracking error detection. The sub-spots SS1 and SS2 are formed by ±1-order diffracted light beams leaving the diffraction grating 3.

Figure 3:
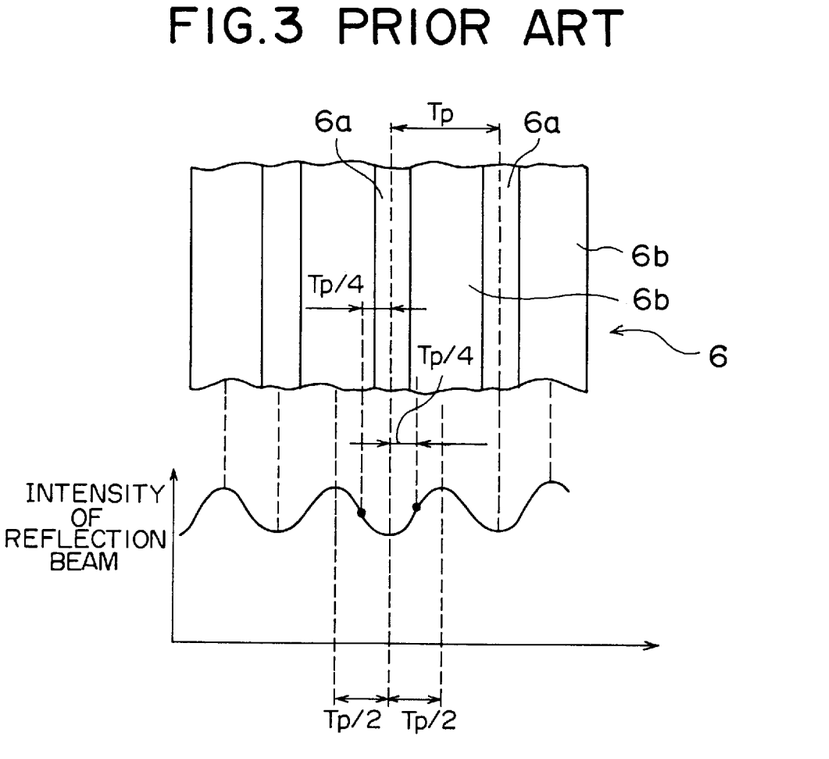
FIG. 3 is a diagram for explaining a change of intensity of a reflection beam from a spot on an optical disk when the optical disk is crossed by the spot.

FIG. 3 shows a change of intensity of a reflection beam from a spot cast by the conventional optical pickup device on the optical disk 6 when the optical disk 6 is crossed by the spot in a track crossing direction.

As shown in FIG. 3, it is assumed that when the spot is on the center of the groove 6a of the optical disk 6, the intensity of the reflection beam becomes the minimum, and when the spot is on the center of the land 6b of the optical disk 6, the intensity of the reflection beam becomes the maximum. In the present case, the rate of change of the intensity of the reflection beam is the maximum when the spot is at positions that are distant from the center of the groove 6a by Tp/4 (which is one-fourth of the track pitch Tp of the optical disk 6).

When the three-beam method is utilized, the tracking error is determined by detecting a difference between the intensities of the reflection beams reflected from the sub-spots SS1 and SS2 on the optical disk 6. In order to provide a high level of accuracy of the tracking error detection, the sub-spots SS1 and SS2 are cast on the optical disk 6 by the ±1-order diffracted light beams from the diffraction grating 3 such that the sub-spots SS1 and SS2 are at positions distant from the center of the groove 6a of the optical disk 6 by Tp/4.

Compact disks (CD) and laser disks (LD) are optical disks of the existing type, and these optical disks have a track pitch Tp of about 1.6 $\mu$m. At present, this track pitch is a standard track pitch of the existing-type optical disks. For the existing-type optical disks, the positions of the sub-spots SS1 and SS2 on the optical disk are arranged such that the sub-spots SS1 and SS2 are at the positions which are distant from the center of the groove of the optical disk by 0.4 $\mu$m (which is one-fourth of the 1.6-$\mu$m track pitch Tp). In order to provide a high level of accuracy of the tracking error detection, it is necessary that the rate of change of the intensity of the reflection beams from the sub-spots SS1 and SS2 is the maximum at the positions where the sub-spots SS1 and SS2 are cast on the optical disk 6.

Figure 4:
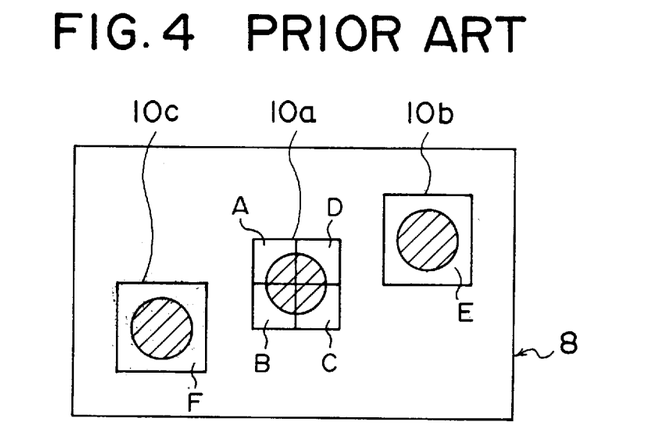
FIG. 4 is a plan view of a photodetector unit of the conventional optical pickup device in FIG. 1.

FIG. 4 shows a photodetector unit of the conventional optical pickup device in FIG. 1.

As shown in FIG. 4, the photodetector unit 8 includes a four-division photodetector 10a for receiving a reflection beam from the main spot SM on the optical disk 6, and two photodetectors 10b and 10c for receiving reflection beams from the sub-spots SS1 and SS2 on the optical disk 6. The four-division photodetector 10a outputs signals A, B, C, and D when the reflection beam from the main spot SM is received. The photodetector 10b and the photodetector 10c respectively output a signal E and a signal F when the reflection beams from the sub-spots SS1 and SS2 are received.

The conventional optical pickup device detects information on the optical disk 6 by outputting an information signal RF, detects a focus error by outputting a focus error signal dF, and detects a tracking error by outputting a tracking error signal dT, in accordance with the above-mentioned signals output from the photodetector unit 8. These output signals are generated in accordance with the following equations.

$$RF=A+B+C+D$$

$$dF=(A+C)-(B+D)$$

$$dT=E-F$$

In a case of the above optical pickup device, the relative positions of the main spot SM and the sub-spots SS1 and SS2 on the optical disk 6 are fixed. The compact disks (CD) and laser disks (LD) which are the optical disks of the existing type have the track pitch Tp of about 1.6 $\mu$m. The above optical pickup device can provide a proper tracking error detection when the optical disk of the existing type is accessed.

Recently, an optical disk of a new type having a track pitch which is substantially half the track pitch of the existing-type optical disk has been proposed for a high-density, massive data storage.

When the optical disk of the new type is accessed by the above optical pickup device, the relative positions of the main spot and the sub-spots on the optical disk, which are fixed for the existing-type optical disk, do not match the reduced track pitch of the new-type optical disk. The positions of the sub-spots SS1 and SS2 on the new-type optical disk when the main spot SM is on the center of the groove of that optical disk cannot be arranged such that the sub-spots SS1 and SS2 are at positions which are distant from the center of the groove of that optical disk by one-fourth of the reduced track pitch because of the fixed relative positions. Therefore, it is impossible that the above optical pickup device provides a proper tracking error detection when the optical disk of the new type is accessed.

Japanese Laid-Open Patent Application No. 6-318335 teaches an optical pickup device using the three-beam method of tracking error detection. In order to provide a stable tracking error servo control for optical disks having different track pitches, this optical pickup device includes a pickup block rotatably supported on a carrying base. The pickup block including the entire optical system is rotatable around an optical axis of an objective lens relative to the accessed optical disk.

In the case of the optical pickup device of the above publication, when an optical disk having a different track pitch is accessed, the relative positions of the main spot and the sub-spots on the optical disk can be adjusted in accordance with the track pitch of the accessed optical disk to provide a proper tracking error detection for that optical disk.

However, the optical pickup device of the above publication requires an adjusting mechanism which rotates the entire optical system in accordance with a various track pitch of the optical disk. The construction of the optical system within the optical pickup device must be greatly changed. For this reason, the manufacturing cost of the optical disk drive including such a pickup device becomes high.

SUMMARY OF THE INVENTION

An object of the present invention is to provide an improved optical pickup device in which the above-described problems are eliminated.

Another object of the present invention is to provide an optical pickup device which provides a proper tracking error detection with a high level of accuracy for each of the existing-type optical disk and the new-type optical disk having different track pitches.

Still another object of the present invention is to provide an optical pickup device which provides a proper tracking error detection for each of the optical disks having different track pitches without need for greatly changing the construction of the optical system within the optical pickup device.

The above-mentioned objects of the present invention are achieved by an optical pickup device which includes an optical system forming a main spot and a pair of sub-spots on an optical disk by a beam of light passing the optical system; a photodetector unit, associated with the optical system, outputting first signals in response to a reflection beam from the main spot, and outputting second signals in response to reflection beams from the sub-spots; a tracking error detector including a first detection circuit designed to output a first tracking error signal for a first track pitch in response to the second signals from the photodetector unit, and a second detection circuit designed to output a second tracking error signal for a second track pitch in response to the first signals and the second signals from the photodetector unit, the second track pitch being different from the first track pitch; and a switch selectively connecting one of the first detection circuit and the second detection circuit to an output of the tracking error detector in response to a track pitch of the optical disk, the tracking error detector outputting one of the first tracking error signal and the second tracking error signal which is appropriate for the track pitch of the optical disk.

It is possible that the optical pickup device of the present invention provide a proper tracking error detection with a high level of accuracy for each of the optical disks of different types having different track pitches without need for changing the entire construction of the optical system within the optical pickup device.

BRIEF DESCRIPTION OF THE DRAWINGS

Other objects, features and advantages of the present invention will become more apparent from the following detailed description when read in conjunction with the accompanying drawings in which.

DETAILED DESCRIPTION OF THE PREFERRED EMBODIMENTS

A description will now be given of the preferred embodiments of the present invention with reference to the accompanying drawings.

Figure 5:
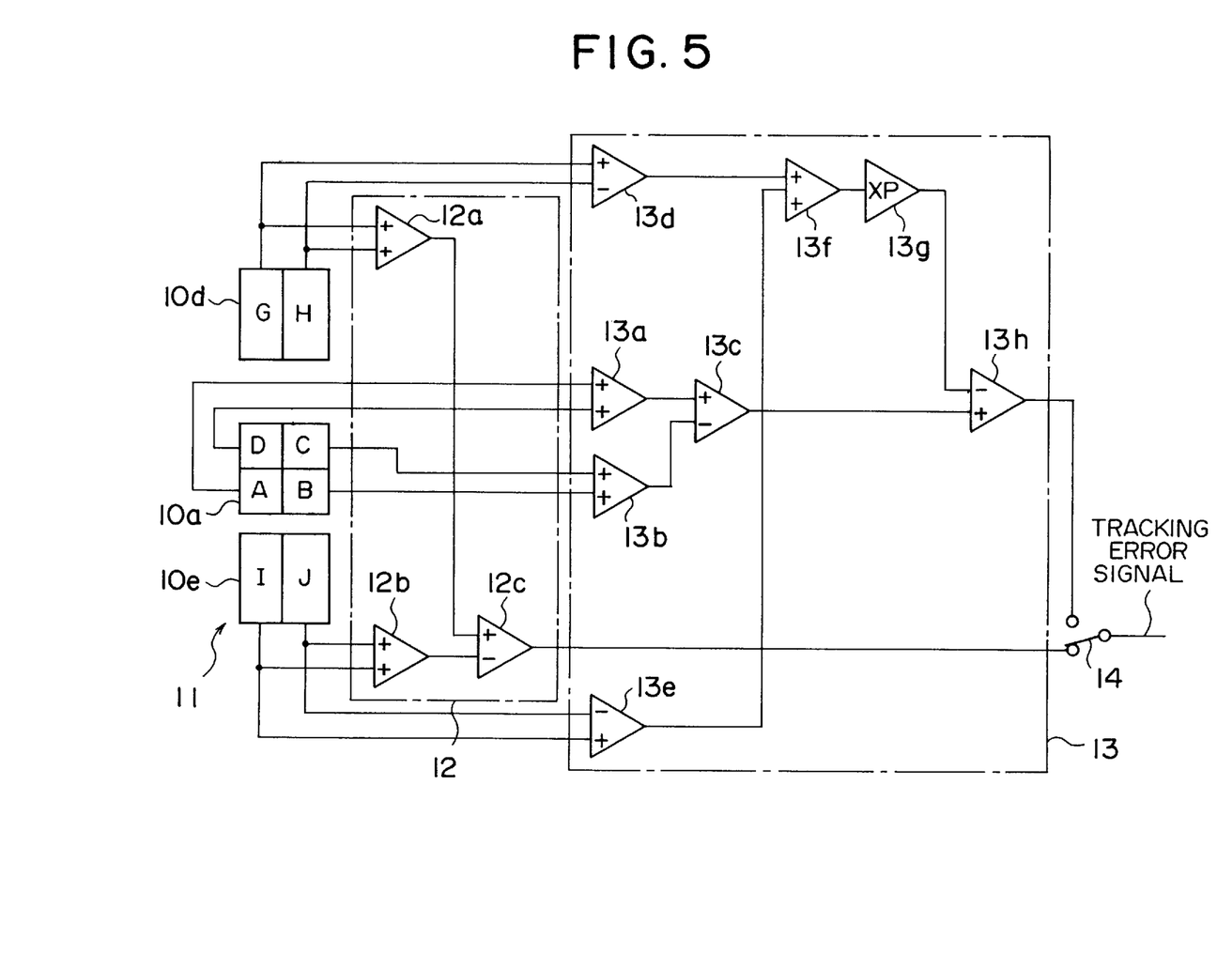
FIG. 5 is a circuit diagram of a tracking error detector in one embodiment of the present invention.
Figure 6:
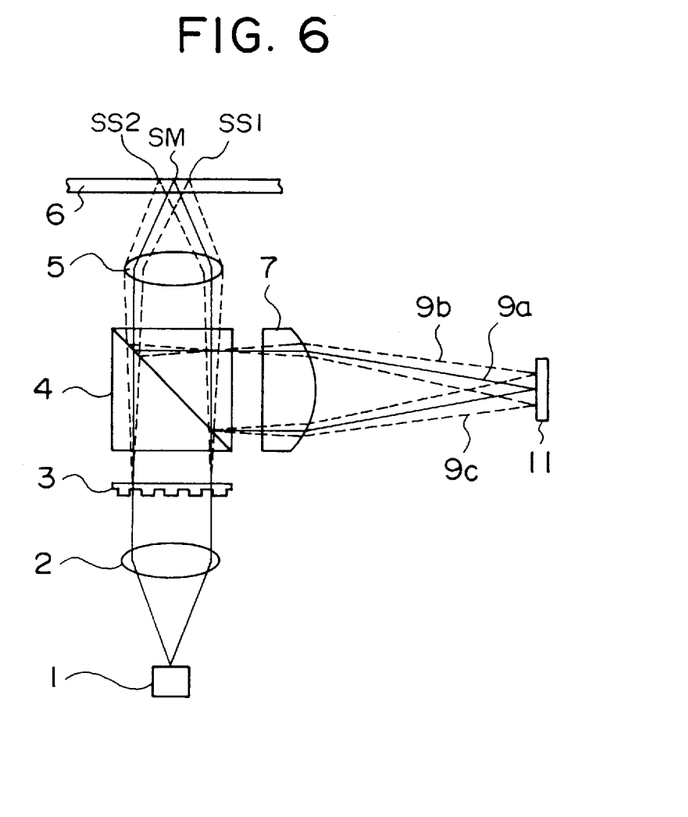
FIG. 6 is a side view of an optical system of an optical pickup device to which the embodiment of the present invention is applied.
Figure 7:
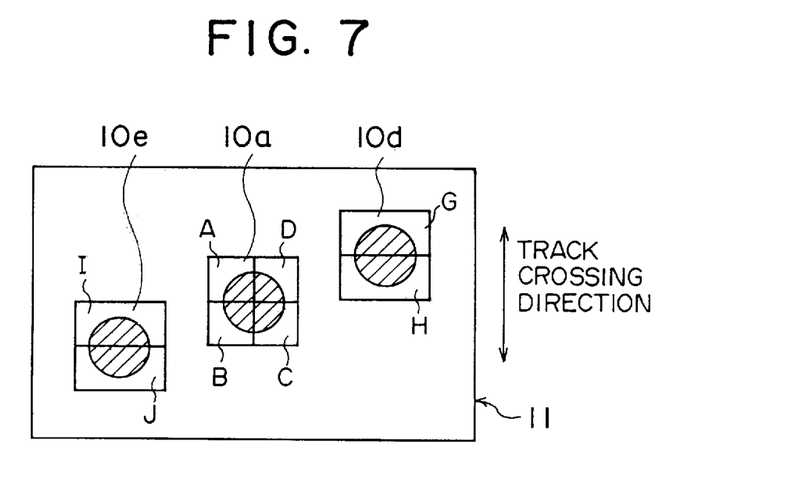
FIG. 7 is a plan view of a photodetector unit of the optical pickup device in FIG. 6.
Figure 8:
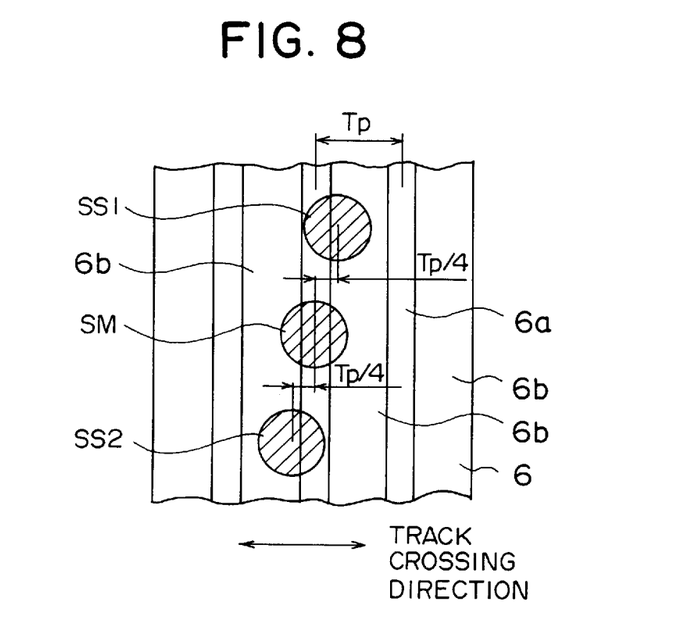
FIG. 8 is a diagram for explaining a relationship in position between spots from the optical pickup device and a track of an optical disk having a first track pitch.
Figure 9:
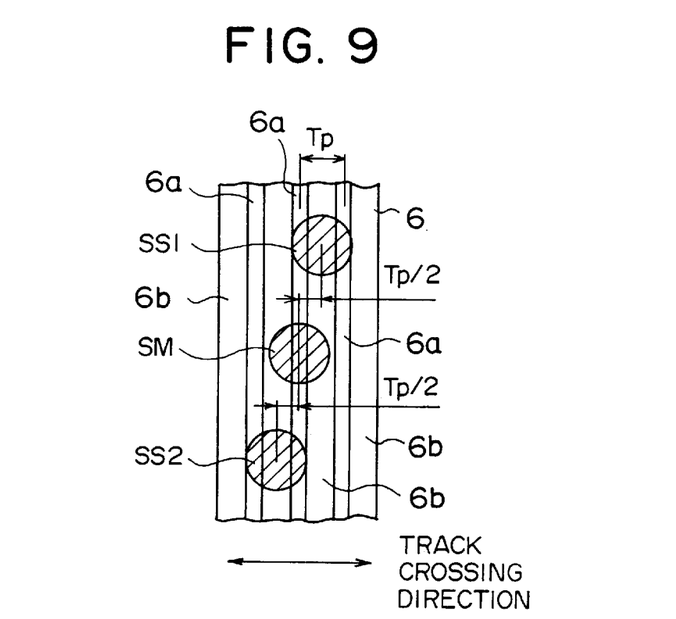
FIG. 9 is a diagram for explaining a relationship in position between spots from the optical pickup device and a track of another optical disk having a second track pitch.

FIG. 5 shows a tracking error detector in one embodiment of the present invention. FIG. 6 shows an optical system of an optical pickup device to which the embodiment of the present invention is applied. FIG. 7 shows a photodetector unit of the optical pickup device in FIG. 6. FIG. 8 shows a relationship in position between spots from the optical pickup device and a track of an optical disk having a first track pitch. FIG. 9 shows a relationship in position between spots from the optical pickup device and a track of another optical disk having a second track pitch.

In FIGS. 5 through 9, the elements which are the same as corresponding elements in FIGS. 1 through 4 are designated by the same reference numerals, and a description thereof will be omitted.

In the optical pickup device of the present embodiment, a photodetector unit 11 (FIG. 7) is provided instead of the photodetector unit 8 (FIG. 4). As shown in FIG. 7, the photodetector unit 11 includes the four-division photodetector 10a for receiving a reflection beam from the main spot SM on the optical disk 6, and two-division photodetectors 10d and 10e for receiving reflection beams from the sub-spots SS1 and SS2 on the optical disk 6. The two-division photodetectors 10d and 10e are different from the photodetectors 10b and 10c in the photodetector unit 8. Each of the photodetectors 10d and 10e has two photodetecting elements arrayed in a track crossing direction (which is a radial direction of the optical disk 6). The photodetector unit 11 has a total of eight photodetecting elements.

Referring to FIGS. 6 and 7, the four-division photodetector 10a outputs the signals A, B, C, and D when a reflection beam from the main spot SM formed by the 0-order diffracted light beam 9a is received by the four divisions of the photodetector 10a. The two-division photodetector 10d outputs signals G and H when a reflection beam from the sub-spot SS1 formed by the +1-order diffracted light beam 9b is received by the two divisions of the photodetector 10d. The two-division photodetector 10e outputs signals I and J when a reflection beam from the sub-spot SS2 formed by the +1-order diffracted light beam 9c is received by the two divisions of the photodetector 10e.

Referring to FIG. 5, the tracking error detector detects a tracking error by outputting a tracking error signal dT, in accordance with the above-mentioned signals output from the photodetector unit 11.

In FIG. 5, a summing amplifier 12a generates a sum of the signals G and H from the two-division photodetector 10d. A summing amplifier 12b generates a sum of the signals I and J from the two-division photodetector 10e. A subtracting amplifier 12c generates a difference between the sum (G+H) from the summing amplifier 12a and the sum (I+J) from the summing amplifier 12b. A first tracking error detection circuit 12, which includes the summing amplifier 12a, the summing amplifier 12b and the subtracting amplifier 12c, detects a tracking error by outputting a tracking error signal dT at the output of the subtracting amplifier 12c in accordance with the equation:

$$dT=(G+H)-(I+J) \qquad (1)$$

In the present embodiment, the first tracking error detection circuit 12 performs a tracking error detection according to the known three-beam method.

In the present embodiment, the tracking error detector further includes a second tracking error detection circuit 13. The second tracking error detection circuit 13 performs a tracking error detection according to a differential push-pull method.

The differential push-pull method is known in the prior art. For example, "A New Tracking Servo Method: Differential Push-Pull Method" written by K. Ohsato in the Optical Memory Symposium held on Dec. 18, 1986 in Tokyo, teaches the principle and characteristics of the differential push-pull method.

In FIG. 5, a summing amplifier 13a generates a sum of the signals A and D from the four-division photodetector 10a. A summing amplifier 13b generates a sum of the signals B and C from the four-division photodetector 10a. The signals A and D and the signals B and C are output from the photodetecting elements of the four-division photodetector 10a arrayed on the same side of the photodetector 10a with respect to the track crossing direction. A subtracting amplifier 13c generates a difference between the sum (A+D) from the summing amplifier 13a and the sum (B+C) from the summing amplifier 13b.

Further, as shown in FIG. 5, a subtracting amplifier 13d generates a difference between the signal G and the signal H from the two-division photodetector 10d. A subtracting amplifier 13e generates a difference between the signal I and the signal J from the two-division photodetector 10e. A summing amplifier 13f generates a sum of the difference (G−H) from the subtracting amplifier 13d and the difference (I−J) from the subtracting amplifier 13e. A constant-multiplying amplifier 13g generates a P-fold value of the output of the summing amplifier 13f, where P is a constant coefficient which is predetermined depending on a ratio of the amplitude of a signal generated from each of the reflection beams from the sub-spots SS1 and SS2 to the amplitude of a signal generated from the reflection beam from the main spot SM. A subtracting amplifier 13h generates a difference between the difference from the subtracting amplifier 13c and the P-fold value from the amplifier 13g.

The second tracking error detection circuit 13, which includes the summing amplifier 13a, the summing amplifier 13b, the subtracting amplifier 13c, the subtracting amplifier 13d, the subtracting amplifier 13e, the summing amplifier 13f, the amplifier 13g, and the subtracting amplifier 13h, detects a tracking error by outputting a tracking error signal dT at the output of the subtracting amplifier 13h in accordance with the equation:

$$dT=(A+D)-(B+C)-P\{(G-H)+(I-J)\} \qquad (2)$$

As described above, the second tracking error detection circuit 13 of the present embodiment performs a tracking error detection according to the known differential push-pull method. When the differential push-pull method is utilized, it is necessary that the sub-spots are cast at positions on the optical disk distant from the center of the groove of the optical disk by Tp/2 (half the track pitch Tp of the optical disk) with the main spot being on the center of the groove, in order to provide a high level of accuracy of the tracking error detection.

In the tracking error detector shown in FIG. 5, one of the output of the subtracting amplifier 12c and the output of the subtracting amplifier 13h is selectively connected by a switch 14 to the output of the tracking error detector.

In addition, the optical pickup device of the present embodiment detects information on the optical disk 6 by outputting an information signal RF, and detects a focus error by outputting a focus error signal dF, in accordance with the above signals output from the photodetector unit 11. The output signals RF and dF are generated in accordance with the following equations:

$$RF=A+B+C+D$$

$$dF=(A+C)-(B+D).$$

When the existing-type optical disk 6 having a track pitch Tp of about 1.6 μm (which is referred to as the first track pitch) is accessed by the optical pickup device of the present embodiment, the tracking error signal dT is output by the optical pickup device, as follows.

In the present case, the relative positions of the main spot SM and the sub-spots SS1 and SS2 on the optical disk 6 are as shown in FIG. 8. In the optical pickup device of the present embodiment, the switch 14 selectively connects the output of the first tracking error detection circuit 12 to the output of the tracking error detector when the existing-type optical disk 6 is accessed.

As shown in FIG. 8, when the main spot SM is on the center of the groove 6a of the optical disk 6, the sub-spots SS1 and SS2 are at positions which are distant in the track crossing direction from the center of the groove 6a of the optical disk 6 by one-fourth of the first track pitch (Tp/4 in the present case is equal to 0.4 μm). Therefore, described above, the first tracking error detection circuit 12 of the present embodiment outputs the tracking error signal dT in accordance with the above Equation (1).

On the other hand, when the new-type optical disk 6 having a track pitch Tp of about 0.8 μm (which is referred to as the second track pitch) is accessed by the optical pickup device of the present embodiment, the tracking error signal dT is output by the optical pickup device, as follows.

In the present case, the relative positions of the main spot SM and the sub-spots SS1 and SS2 on the optical disk 6 are as shown in FIG. 9. In the optical pickup device of the present embodiment, the switch 14 selectively connects the output of the second tracking error detection circuit 13 to the output of the tracking error detector when the new-type optical disk 6 is accessed.

As shown in FIG. 9, when the main spot SM is on the center of the groove 6a of the optical disk 6, the sub-spots SS1 and SS2 are at positions which are distant in the track crossing direction from the center of the groove 6a of the optical disk 6 by half the second track pitch (Tp/2 in the present case is equal to 0.4 μm). This means that the sub-spots SS1 and SS2 respectively lie on the centers of the lands 6b of the optical disk 6 adjacent to the above groove 6a thereof.

Since the rate of change of the intensity of the reflection beam when the spot is on the center of the land of the optical disk becomes the minimum as shown in FIG. 3, the first tracking error detection circuit 12 of the present embodiment cannot provide a proper tracking error detection for the present case. In the present case, the second tracking error detection circuit 13 of the present embodiment, which is selected by the switch 14, outputs the tracking error signal dT in accordance with the above Equation (2). As described above, the second tracking error detection circuit 13 of the present embodiment performs a tracking error detection according to the known differential push-pull method, and provides a proper tracking error detection for the present case.

Therefore, since the switch 14 selectively connects one of the first tracking error detection circuit 12 and the second tracking error detection circuit 13 to the output of the tracking error detector in accordance with the track pitch of the accessed optical disk, it is possible that the optical pickup device of the present embodiment provides a proper tracking error detection with a high level of accuracy for each of the optical disks of different types having different track pitches without need for a major change of the construction of the optical system within the optical pickup device.

In the optical pickup device of the present embodiment, the operation of the switch 14 to selectively connect one of the first tracking error detection circuit 12 and the second tracking error detection circuit 13 to the output of the tracking error detector is automatically performed in accordance with the track pitch of the optical disk accessed by the optical pickup device. To provide this function of the switch 14 for the optical pickup device, it is necessary to utilize a known method of determining a track pitch of the optical disk.

For example, each of Japanese Laid-Open Patent Application No. 6-301980 and Japanese Laid-Open Patent Application No. 6-318323 teaches a method of determining a track pitch of the optical disk. The teaching of these publications is utilized for the optical pickup device of the present embodiment.

Next, a description will be given of a tracking error detector in another embodiment of the present invention with reference to FIG. 10.

Figure 10:
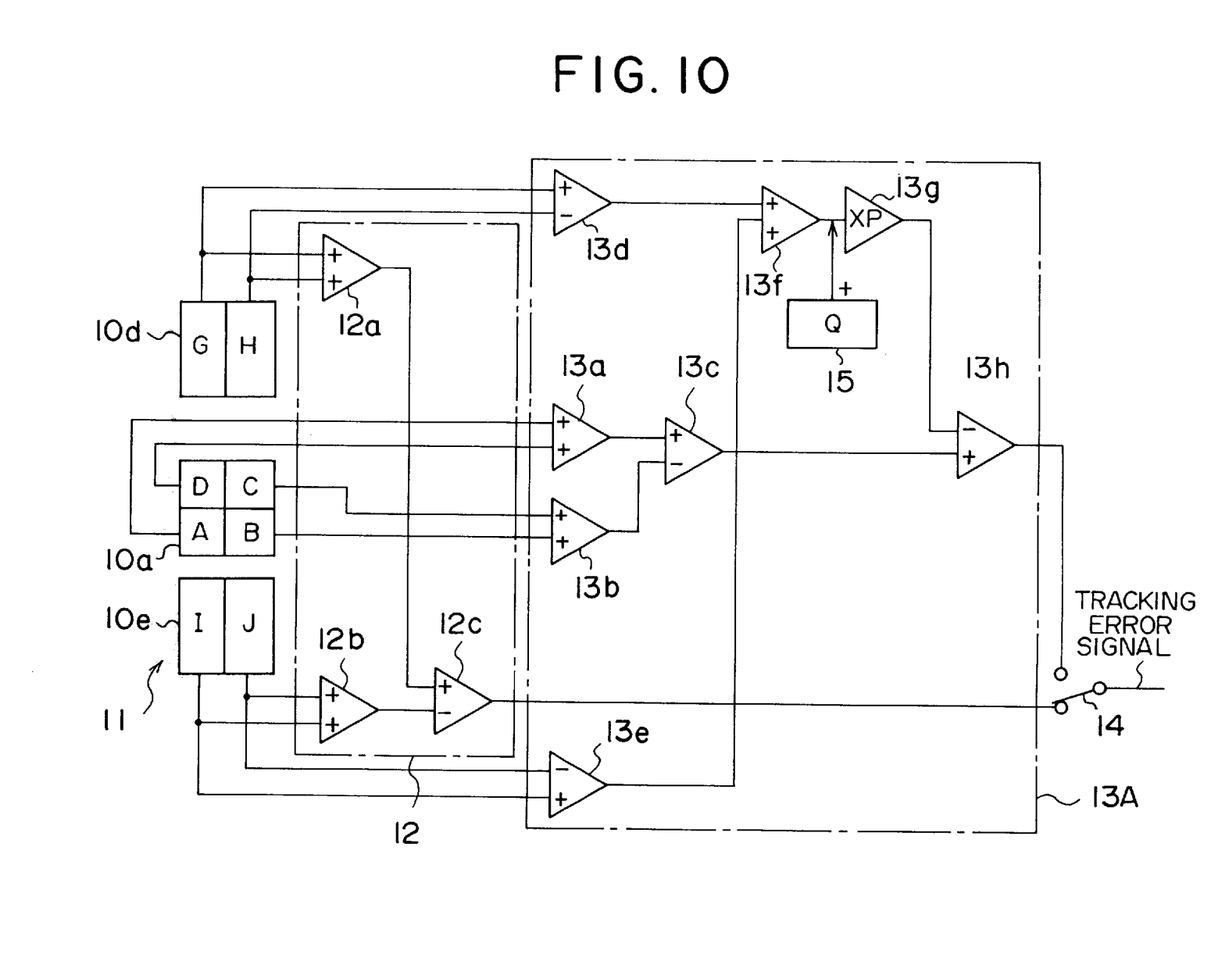
FIG. 10 is a circuit diagram of a tracking error detector in another embodiment of the present invention.

In FIG. 10, the elements which are the same as corresponding elements in FIG. 5 are designated by the same reference numerals, and a description thereof will be omitted.

As shown in FIG. 10, the tracking error detector of the present embodiment includes the first tracking error detection circuit 12 and a second tracking error detection circuit 13A. The first tracking error detection circuit 12 in this embodiment is the same as that of the tracking error detector in FIG. 5.

In the second tracking error detection circuit 13A, shown in FIG. 10, a correction unit 15 which adds a predetermined offset Q to the output of the summing amplifier 13f is provided. Other elements of the second tracking error detection circuit 13A are the same as corresponding elements of the second tracking error detection unit 13 in FIG. 5. As previously described, the summing amplifier 13f generates at its output the sum of the difference (G–H) from the two-division photodetector 10d and the difference (I–J) from the two-division photodetector 10e. This sum {(G–H)+(I–J)} is indicated by a processed signal generated from the reflections beams from the sub-spots SS1 and SS2 on the optical disk 6.

In the previous embodiment, it is supposed that the reflection beams from the sub-spots SS1 and SS2 on the optical disk 6 hit the two-division photodetectors 10d and 10e in a symmetrical manner with respect to a division line of each of the photodetectors 10d and 10e when the reflection beam from the main spot SM on the optical disk 6 hits the center of the four-division photodetector 10a, as shown in FIG. 7. Practically, however, it is very difficult that the reflection beam from the main spot SM is adjusted to be on the center of the four-division photodetector 10a and the reflection beams from the sub-spots SS1 and SS2 are adjusted to be on the center of each of the two-division photodetectors 10d and 10e.

In the present embodiment, it is taken into consideration that an offset of the processed signal is produced when the reflection beam from the main spot SM exactly hits the center of the four-division photodetector 10a and the reflection beams from the sub-spots SS1 and SS2 hit the centers of the two-division photodetectors 10d and 10e in a non-symmetrical manner. The above offset is produced due to the asymmetrical intensity distribution of the reflection beams on the photodetector unit 11 at the two-division photodetectors 10d and 10e. This offset is represented by −Q. Since the correction unit 15 adds the offset Q to the output of the summing amplifier 13f, the above offset of the processed signal at the output of the summing amplifier 13f is canceled by the offset from the correction unit 15.

Accordingly, the second tracking error detection circuit 13A of the present embodiment, which includes the summing amplifier 13a, the summing amplifier 13b, the subtracting amplifier 13c, the subtracting amplifier 13d, the subtracting amplifier 13e, the summing amplifier 13f, the amplifier 13g, the correction unit 15, and the subtracting amplifier 13h, detects a tracking error by outputting a corrected tracking error signal dT at the output of the subtracting amplifier 13h in accordance with the equation:

$$dT=(A+D)-(B+C)-P\{(G-H)+(I-J)+Q\} \qquad (3)$$

Therefore, it is possible that the optical pickup device of the present embodiment provides a proper tracking error detection with a higher level of accuracy when the new-type optical disk having the second track pitch is accessed and the reflection beams from the sub-spots SS1 and SS2 hit the two-division photodetectors 10d and 10e in a non-symmetrical manner.

Next, a description will be given of a tracking error detector in a further embodiment of the present invention with reference to FIG. 11.

Figure 11:
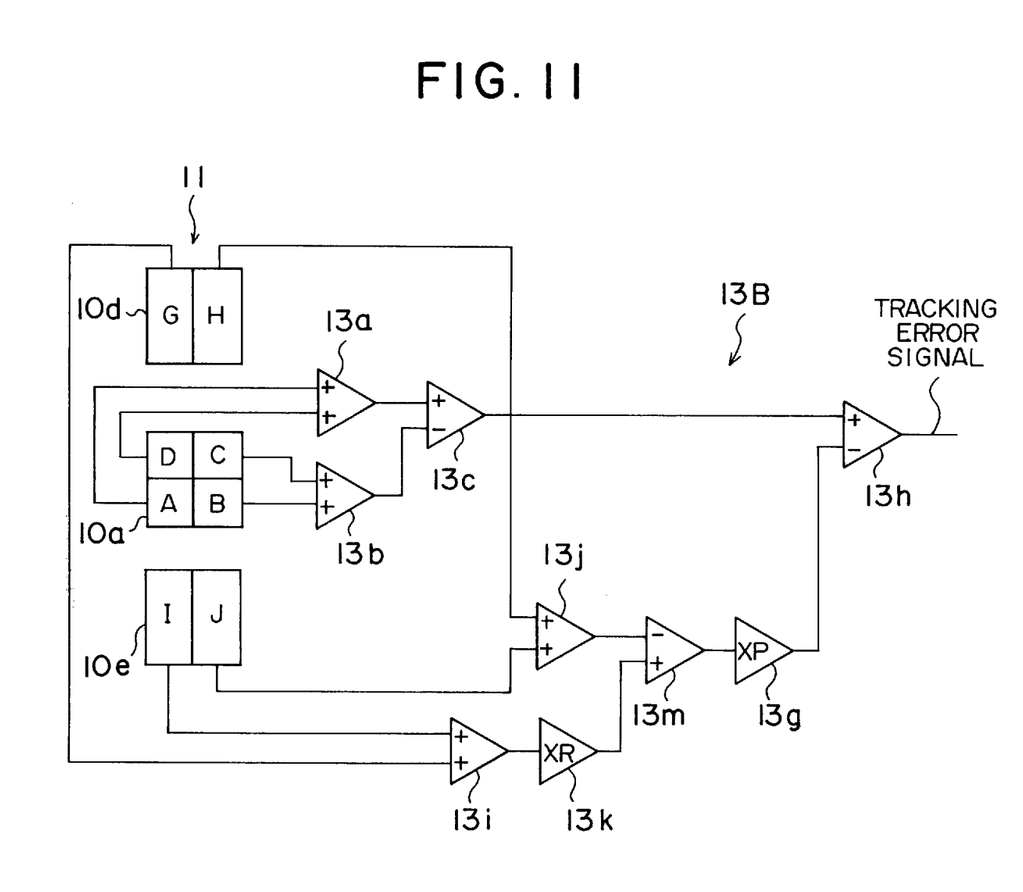
FIG. 11 is a circuit diagram of a differential push-pull tracking error detection circuit of a tracking error detector in a further embodiment of the present invention.

In FIG. 11, only a second tracking error detection circuit 13B (which is different from the second tracking error detection circuit 13 in FIG. 5) of the tracking error detector of the present embodiment is shown. For the sake of simplicity of explanation, a first tracking error detection circuit of the tracking error detector of the present embodiment is omitted. The first tracking error detection circuit of the tracking error detector of the present embodiment is the same as the first tracking error detection circuit 12 of the tracking error detector shown in FIG. 5.

In the second tracking error detection circuit 13B, shown in FIG. 11, the summing amplifier 13a, the summing amplifier 13b and the subtracting amplifier 13c which are the same as corresponding elements in FIG. 5 are provided. A summing amplifier 13i generates a sum of the signal G from the two-division photodetector 10d and the signal I from the two-division photodetector 10e. A summing amplifier 13j generates a sum of the signal H from the two-division photodetector 10d and the signal J from the two-division photodetector 10e. A constant-multiplying amplifier 13k generates a R-fold value of the output of the summing amplifier 13i, where R is a corrected gain of the summing amplifier 13i which is predetermined depending on the asymmetrical intensity distribution of the reflection beams from the sub-spots SS1 and SS2 on the two-division photodetectors 10d and 10e. A subtracting amplifier 13m generates a difference between the R-fold output of the summing amplifier 13i from the amplifier 13k and the sum from the summing amplifier 13j. The amplifier 13g and the subtracting amplifier 13h are the same as corresponding elements of the previous embodiment in FIG. 5.

In the present embodiment, it is taken into consideration that an offset of the processed signal at the output of the summing amplifier 13i in connection with the processed signal at the output of the summing amplifier 13j is produced when the reflection beam from the main spot SM exactly hits the center of the four-division photodetector 10a and the reflection beams from the sub-spots SS1 and SS2 hit the centers of the two-division photodetectors 10d and 10e in a non-symmetrical manner. The above offset is produced due to the asymmetrical intensity distribution of the reflection beams on the photodetector unit 11 at the two-division photodetectors 10d and 10e, and this offset is canceled by an offset included in the R-fold output of the summing amplifier 13i at the output of the amplifier 13k.

Accordingly, the second tracking error detection circuit 13B of the present embodiment, which includes the summing amplifier 13a, the summing amplifier 13b, the subtracting amplifier 13c, the summing amplifier 13i, the summing amplifier 13j, the amplifier 13k, the subtracting amplifier 13m, the amplifier 13g, and the subtracting amplifier 13h, detects a tracking error by outputting a corrected tracking error signal dT at the output of the subtracting amplifier 13h in accordance with the equation:

$$dT=(A+D)-(B+C)-P\{R(G+I)-(H+J)\} \qquad (4)$$

Therefore, it is possible that the optical pickup device of the present embodiment provides a proper tracking error detection with a higher level of accuracy when the new-type optical disk having the second track pitch is accessed and the reflection beams from the sub-spots SS1 and SS2 hit the two-division photodetectors 10d and 10e in a non-symmetrical manner.

Further, the present invention is not limited to the above-described embodiments, and variations and modifications may be made without departing from the scope of the present invention.

What is claimed is:

1. An optical pickup device for accessing an optical disk, comprising:

an optical system forming a main spot and a set of sub-spots on the optical disk by a beam of light processed by said optical system;

a photodetector unit, associated with said optical system, outputting first signals in response to a reflection beam from the main spot, and outputting second signals in response to reflection beams from the sub-spots;

a tracking error detector including a first detection circuit designed to output a first tracking error signal for a first track pitch in response to said second signals from said photodetector unit, and a second detection circuit designed to output a second tracking error signal for a second track pitch in response to said first signals and said second signals from said photodetector unit, said second track pitch being different from said first track pitch; and a switch selectively connecting one of said first detection circuit and said second detection circuit to an output of said tracking error detector in response to a track pitch of said optical disk, said tracking error detector outputting one of said first tracking error signal and said second tracking error signal which is appropriate for said track pitch of said optical disk, wherein said first detection circuit outputs the first tracking error signal dT in accordance with the equation:

$$dT=(G+H)-(I+J)$$

where G, H, I and J are the second signals output from the photodetector unit, and said second detection circuit outputs said second tracking error signal dT in accordance with the equation:

$$dT=(A+D)-(B+C)-P\{(G-H)+(I-J)\}$$

where A, B, C and D are the first signals output from the photodetector unit, G, H, I and J are the second signals output from the photodetector unit, and P is a predetermined coefficient.

2. The optical pickup device according to claim 1, wherein said second track pitch is substantially half said first track pitch.

3. The optical pickup device according to claim 1, wherein said photodetector unit includes a four-division photodetector which receives the reflection beam from the main spot, and a set of two-division photodetectors which receive the reflection beams from the sub-spots.

4. The optical pickup device according to claim 3, wherein each of said two-division photodetectors has two photodetecting elements arrayed in a track crossing direction, each photodetecting element outputting one of the second signals in response to the reflection beam from one of the sub-spots on the optical disk.

5. The optical pickup device according to claim 1, wherein said tracking error detector outputs the first tracking error signal when an optical disk having the first track pitch is accessed, and said tracking error detector outputs the second tracking error signal when another optical disk having the second track pitch is accessed.

6. The optical pickup device according to claim 1, wherein said first track pitch is about 1.6 μm and said second track pitch is about 0.8 μm.

7. The optical pickup device according to claim 1, wherein said second detection circuit comprises a correction unit which adds a predetermined offset to a processed signal produced from the second signals from the photodetector unit when an optical disk having the second track pitch is accessed.

8. The optical pickup device according to claim 1, wherein said second detection circuit comprises an amplifier which generates a corrected value of a processed signal produced from half of the second signals from the photodetector unit when an optical disk having the second track pitch is accessed.

9. The optical pickup device according to claim 8, wherein said photodetector unit includes a set of two-division photodetectors which receive the reflection beams from the sub-spots on the optical disk, said processed signal being produced by a sum of one of the second signals from one of the two-division photodetectors and one of the second signals from the other of the two-division photodetectors.

* * * * *